United States Patent [19]

Litvin et al.

[11] Patent Number: 5,626,424
[45] Date of Patent: May 6, 1997

[54] DUAL LIGHT SOURCE AIMING MECHANISM AND IMPROVED ACTUATION SYSTEM FOR HAND-HELD TEMPERATURE MEASURING UNIT

[75] Inventors: Timothy J. Litvin, Santa Cruz; Ronald P. Briars, Campbell, both of Calif.

[73] Assignee: Raytek Subsidiary, Inc., Santa Cruz, Calif.

[21] Appl. No.: 278,310

[22] Filed: Jul. 21, 1994

[51] Int. Cl.$^6$ ............................ G01K 1/00; G01J 5/02; G01B 11/00
[52] U.S. Cl. .................. 374/121; 374/131; 374/141; 33/DIG. 21; 362/259; 356/399
[58] Field of Search ............................. 374/121, 120, 374/141, 124, 208, 131; 33/241, DIG. 21; 362/35, 259; 356/49, 399

[56] References Cited

U.S. PATENT DOCUMENTS

| | | | |
|---|---|---|---|
| 4,315,150 | 2/1982 | Darringer et al. | 374/120 |
| 4,494,881 | 1/1985 | Everest | 374/120 |
| 4,576,432 | 3/1986 | Ruger | 374/124 |
| 4,626,686 | 12/1986 | Pompei et al. | 374/124 |
| 4,678,289 | 7/1987 | Mattelin et al. | 350/486 |
| 4,722,612 | 2/1988 | Junkert et al. | 374/124 |
| 4,811,061 | 3/1989 | Sud et al. | 356/152 |
| 4,863,243 | 9/1989 | Wakefield | 350/321 |
| 4,880,301 | 11/1989 | Gross | 350/636 |
| 4,883,347 | 11/1989 | Fritzel | 350/500 |
| 4,910,378 | 3/1990 | Arai | 219/121.74 |
| 5,085,525 | 2/1992 | Bartosiak et al. | 374/124 |
| 5,155,327 | 10/1992 | Hoag | 219/121.78 |
| 5,195,707 | 3/1993 | Ignatuk et al. | 248/179 |
| 5,368,392 | 11/1994 | Hollander et al. | 374/121 |
| 5,524,984 | 6/1996 | Hollander et al. | 374/121 |

FOREIGN PATENT DOCUMENTS

| | | | |
|---|---|---|---|
| 458200 | 11/1992 | European Pat. Off. | 374/121 |
| 62-12848 | 3/1987 | Japan. | |

Primary Examiner—Diego F. F. Gutierrez

[57] ABSTRACT

A system for aiming a remote IR temperature sensing device includes a beam splitter assembly and mirror assembly mounted on opposite sides of the body of the device. Both assemblies provide for adjusting the vertical and azimuthal positions of alignment beams to facilitate the use of inexpensive, low-tolerance parts while providing high accuracy to improve sensitivity, accuracy, and resolution. A dual action trigger initiates temperature measurement and logs currently measured temperature information.

8 Claims, 9 Drawing Sheets

DUAL LIGHT SOURCE AIMING MECHANISM AND IMPROVED ACTUATION SYSTEM FOR HAND-HELD TEMPERATURE MEASURING UNIT

BACKGROUND OF THE INVENTION

The present invention relates to the field of aiming systems for infrared temperature sensors. Infrared temperature sensors advantageously do not require surface contact and, instead, use an infrared sensor which receives infrared light from the area where a temperature reading is desired. Appropriate electronics connected to the infrared sensor determine the temperature of the target area.

Infrared sensors have a focal distance and a focal area which are based on the optical properties of the infrared sensor. The focal length and focal area, which is usually circular, are selected based on the particular application.

Aiming systems for infrared temperature sensors are used so that the user can position the temperature sensor in the proper orientation to obtain a temperature reading from a desired target area. U.S. Pat. No. 4,315,150 discloses a known aiming system which uses visible light for targeting.

The system depicted in that patent requires several mechanical elements which must be assembled and aligned to provide accurate positioning. While such a system can be operable, current market conditions and cost constraints require efficient and simple mechanical solutions to alignment problems.

Accordingly, there is a need in the art for a simple, accurate system for aligning beams to define the focal area of the sensor on a target.

SUMMARY OF THE INVENTION

The present invention solves the problems with known aiming systems by providing a beam splitter assembly and mirror assembly which are adjustably mounted to the temperature sensor so that the aiming system can be adjusted according to the particular focal length of the infrared sensor. Thus, a number of different infrared sensors having different focal lengths and focal areas can be used without requiring different structural arrangements. The beam splitter of the present invention splits a visible light beam into two different parts which are used for targeting as described below.

Additionally, the adjustable beam alignment system can be used to direct the beams to converge at a focal spot for a short focus sensor or to define the limits of a divergent beam for a long focus sensor.

Another advantage of the present invention is that it is not subject to manufacturing tolerances since the targeting mechanism is oriented in the proper direction when the instrument is assembled. An infrared sensor, a mirror, a source of visible light, and a beam splitter are attached to the body of the temperature sensor. The infrared sensor has an optical axis, a focus distance and a focus area. The beam splitter receives a beam of light from the light source and splits the beam into two parts.

The adjustability of the orientation of the beams provides for economies in manufacturing and also for more accurate alignment of the aiming beams to increase the resolution and sensitivity of the sensor.

According to another aspect of the invention, to adjust the aiming beams a source of heat is placed in front of the temperature sensor and the body is then oriented so that the optical axis of temperature sensor intersects the desired target site. The orientation of the beam splitter is then adjusted so that a first part of the beam is directed at a predetermined location with respect to the heat source. The mirror is also adjusted so that the second part is also directed at a second predetermined location with respect to the heat source. The first and second predetermined locations may be positioned in any manner, such as coincident in the middle of the focal area or positioned on opposing sides of the focal area, thereby indicating the size of the focal area.

Other features and advantages of the invention will become apparent in view of the following detailed description and appended drawings.

DESCRIPTION OF THE PREFERRED EMBODIMENTS

The invention will now be described with reference to the preferred embodiments. The same or like elements will be given the same reference numbers throughout the several views.

Figure 1:
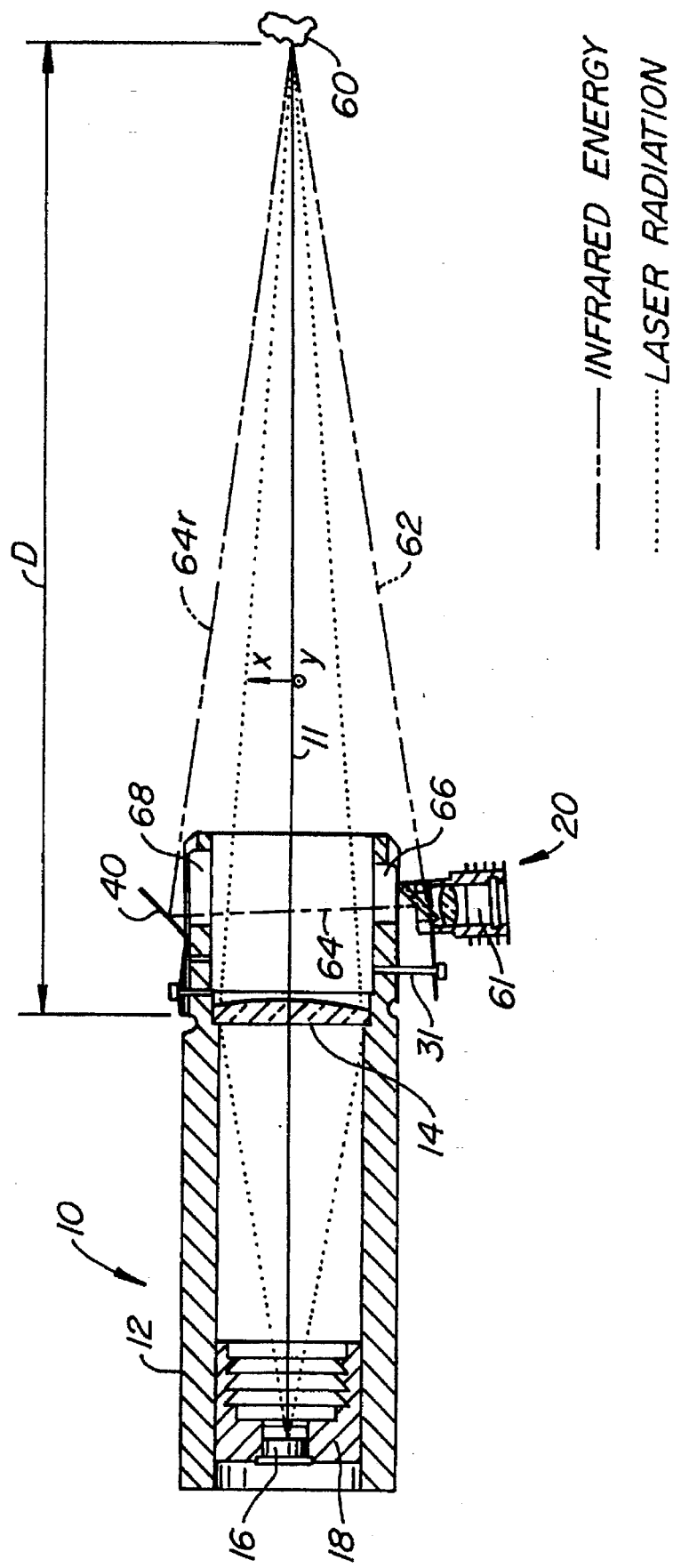
FIG. 1 is a plan view of a preferred embodiment of the invention.

FIG. 1 is a cross sectional view of an assembled system utilizing the principles of the invention. A remote infrared (IR) sensor 10 includes a rectangular cylindrical housing 12 including a cavity holding a detector lens 14, an infrared detector 16, and a detector heatsink 18. A laser focusing system includes a beam splitter assembly 20 and an adjustable mirror element 40. The beam splitter assembly 20 and adjustable mirror element 40 will be described in detail below.

The operation of the laser focusing system will now be described. As depicted in the drawing and well-known in the art, the detector lens focuses at a point located on an optical axis 11 and at a focal point located a fixed distance (D) from the sensor 10, on the surface of the IR detector 16. To achieve an accurate temperature reading, the operator of the sensor desires to hold the sensor a distance D away from the target 60 being measured and pointed so that the optical axis 11 intersects the target 60 so that the spot is accurately focused on the IR detector 16.

The output beam of a semiconductor diode laser 61 is coupled to the beam splitter assembly 20 and split into first and second laser beams 62 and 64. The first beam 62 is directed toward the target 60 and the second beam traverses openings 66 and 68 in the housing 122 to be reflected by the adjustable mirror element 40 as a reflected second beam 64r directed toward the target 60. The beam splitter assembly 20 and adjustable mirror element 40 are designed to orient the direction of the first beam 62 and reflected second beam 64 to converge at the focal point of the lens 14. Accordingly, the operator can accurately position the sensor 10 so that the IR radiated from the target 60 is focused on the IR detector 16.

Figure 2:
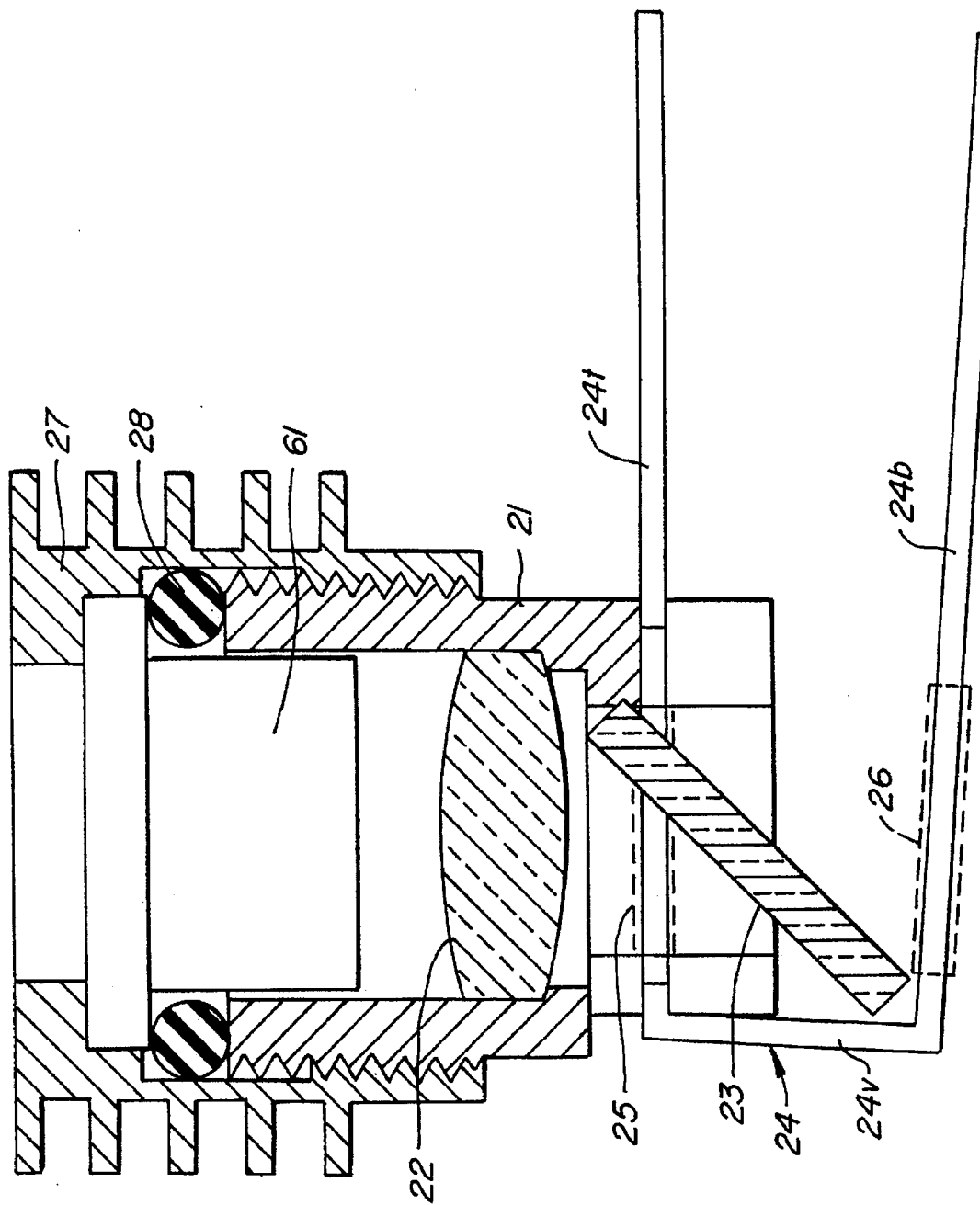
FIG. 2 is a cross-sectional view of the beam splitter assembly.

The structure of the beam splitter assembly 20 will now be described with reference to FIG. 2 which is a cross-sectional plan view of the assembly. In FIG. 2, a circular cylindrical beam splitter housing 21, having an inner bore and an partially threaded outer surface, has a laser focusing lens 22 mounted in its bore and has a beam splitter mirror 23 rigidly attached in a slot near at the lower opening of the housing 21. The beam splitter mirror may be a half-silvered mirror as is well-known.

The beam splitter housing 21 is mounted on a leaf spring member 24 which has beam openings 25 and 26 to allow a laser beam to pass therethrough. The leaf spring member 23 includes top, bottom and vertical sections 24t, 24b, and 24v respectively. The leaf spring configuration and operation will be described more fully below.

A circular cylindrical laser focus adjustor/heatsink 27 holds a diode laser 61. The adjustor 27 includes a partially threaded inner surface and is mounted on the beam splitter housing by screwing the adjustor 27 onto the housing 21. The inner surface includes a recess and an o-ring 28 for forming a seal between the top of the housing 21 and the adjustor 27. The focus of the laser 61 can be adjusted by rotating the adjustor 27.

In the currently preferred embodiment a laser having a wavelength of 670 nanometers (nm) is utilized. This wavelength is not highly visible so that high power is required to allow the operator to view the spots. This high power could possibly injure the eye. An alternative embodiment utilizing a laser having a wavelength of 650 or 630 nm would require reduced power because those wavelengths are more visible to the human eye.

The integrated structure of the beam splitter assembly 20 provides several advantages. The rigid placement of the laser 61, lens 22, and beamsplitter 23 provides for precise alignment of those parts and allows use of a small beamsplitter 23. Additionally, the functions of focusing the laser 61 and sinking heat generated by the laser are also performed by the integrated assembly 20.

Figure 3A:
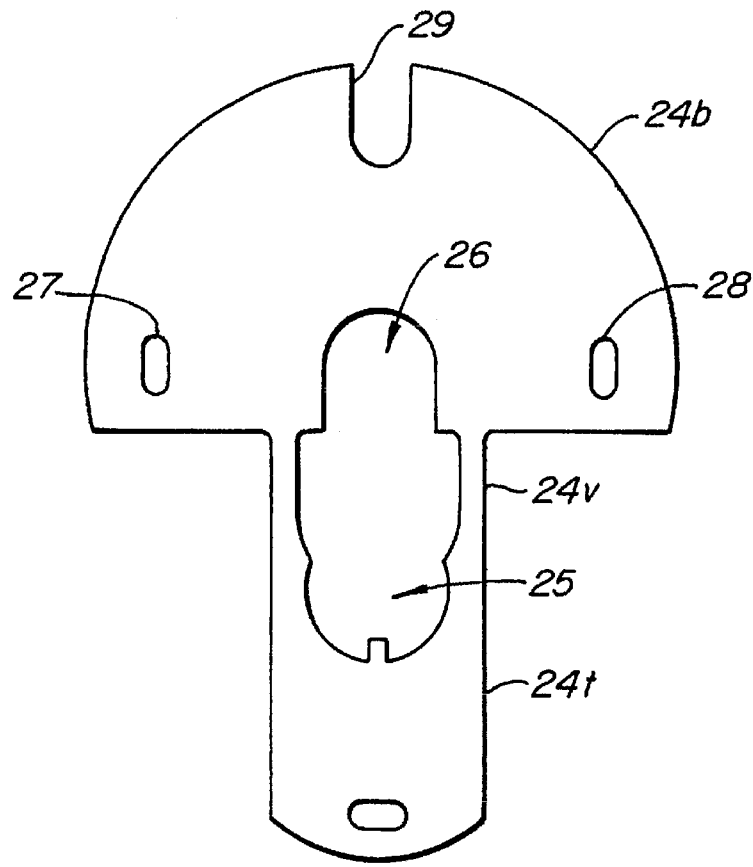
FIGS. 3A and 3B are views of the leaf spring element.
Figure 3B:
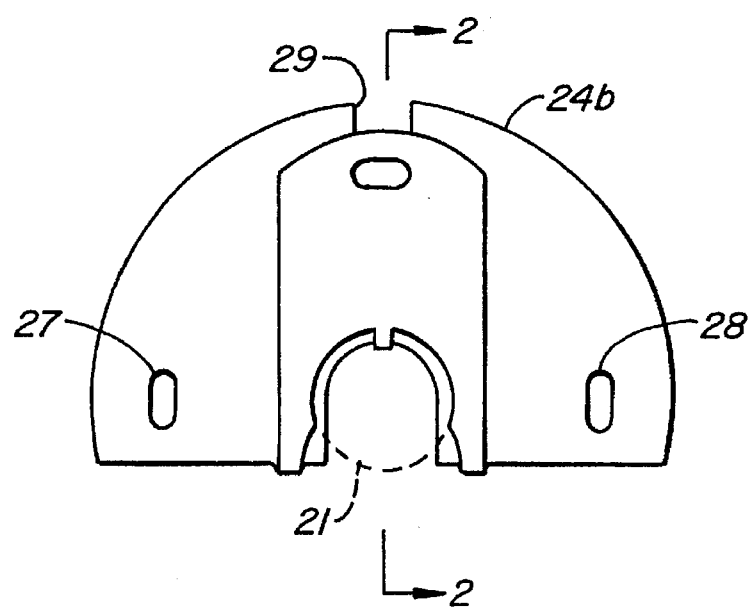

The configuration of one embodiment of the leaf spring member will now be described with reference to FIGS. 2 and 3A and B. FIG. 3A is a plan view of the leaf spring member 24 as an unformed part. Note that member 24 is fabricated as a single piece of metal utilizing known processes such as chemical etching or mechanical stamping. In FIG. 3B the member 24 is depicted as formed part after bending. Because of the adjustment mechanism described below the tolerances for the bending operation are low.

In FIG. 3A, the bottom section 24t has a semicircular outer surface and includes left and right retaining screw slots 27 and 28 and vertical adjustment slot 29. The vertical section 24v is formed by thin metal strips connecting the top section 24t to the diametrical boundary of the semicircular bottom section 24b. The top section 24t includes a vertical adjustment screw slot 30.

Referring back to FIG. 1, a vertical adjustment screw 31 passes through the vertical adjustment slot 29 and vertical adjustment screw slot 30 into a threaded opening in the housing 12. Thus, the vertical angular displacement of the first and second beams in the plane of FIG. 1 can be accurately and easily adjusted merely by turning the vertical adjustment screw 31.

In FIG. 1, the beam splitter assembly is coupled to the housing 12 by retaining screws (not shown) passing through the retaining screw slots 27 and 28 of the leaf spring member.

Figure 4A:
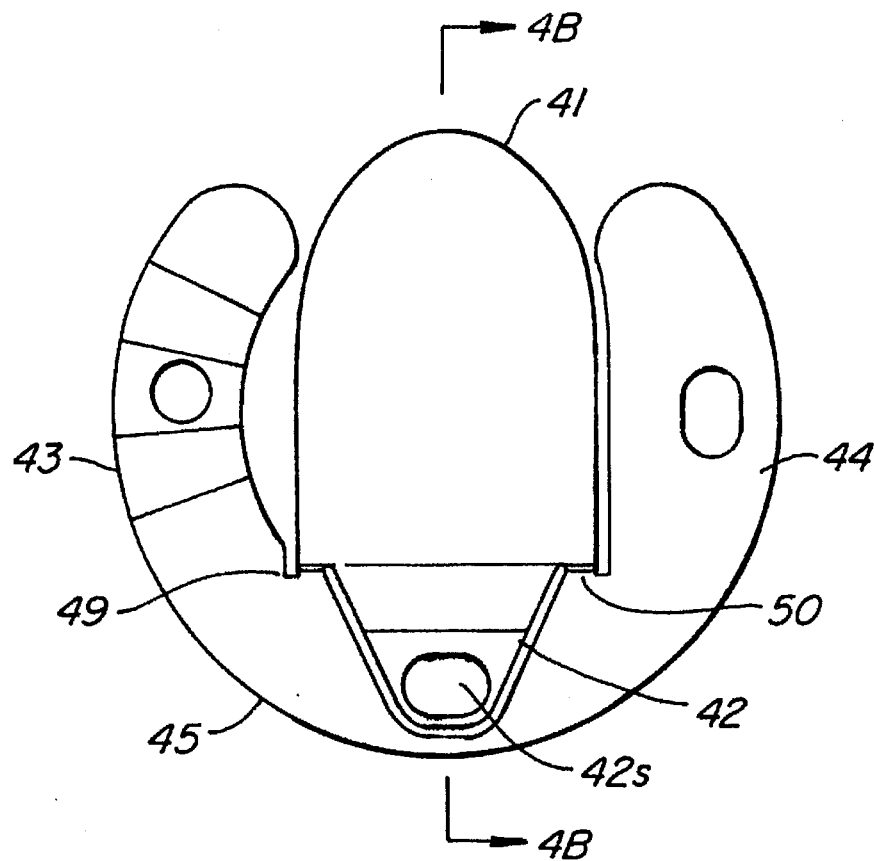
FIGS. 4A and 4B are top and side views, respectively, of the mirror element.

An embodiment of the adjustable mirror element 40 will now be described with reference to FIGS. 4A and B and FIG. 5. FIG. 4A depicts a plan view of the unformed mirror element 40. Again, as with the leaf spring member 24, the mirror element 40 is formed of a single piece of metal using known processes. The element includes a reflecting tab 41, a vertical adjustment tab 42 including a vertical adjustment screw slot 42s, left and right rotational control and mounting tabs 43 and 44, and a base member 45. The right mounting tab 43 includes a vertical riser section 46 and a registration hole 47 and the right mounting tab includes a retaining screw slot 48.

Figure 4B:
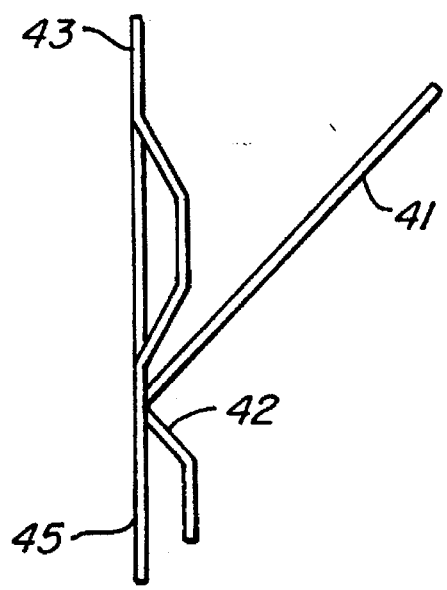
Figure 5:
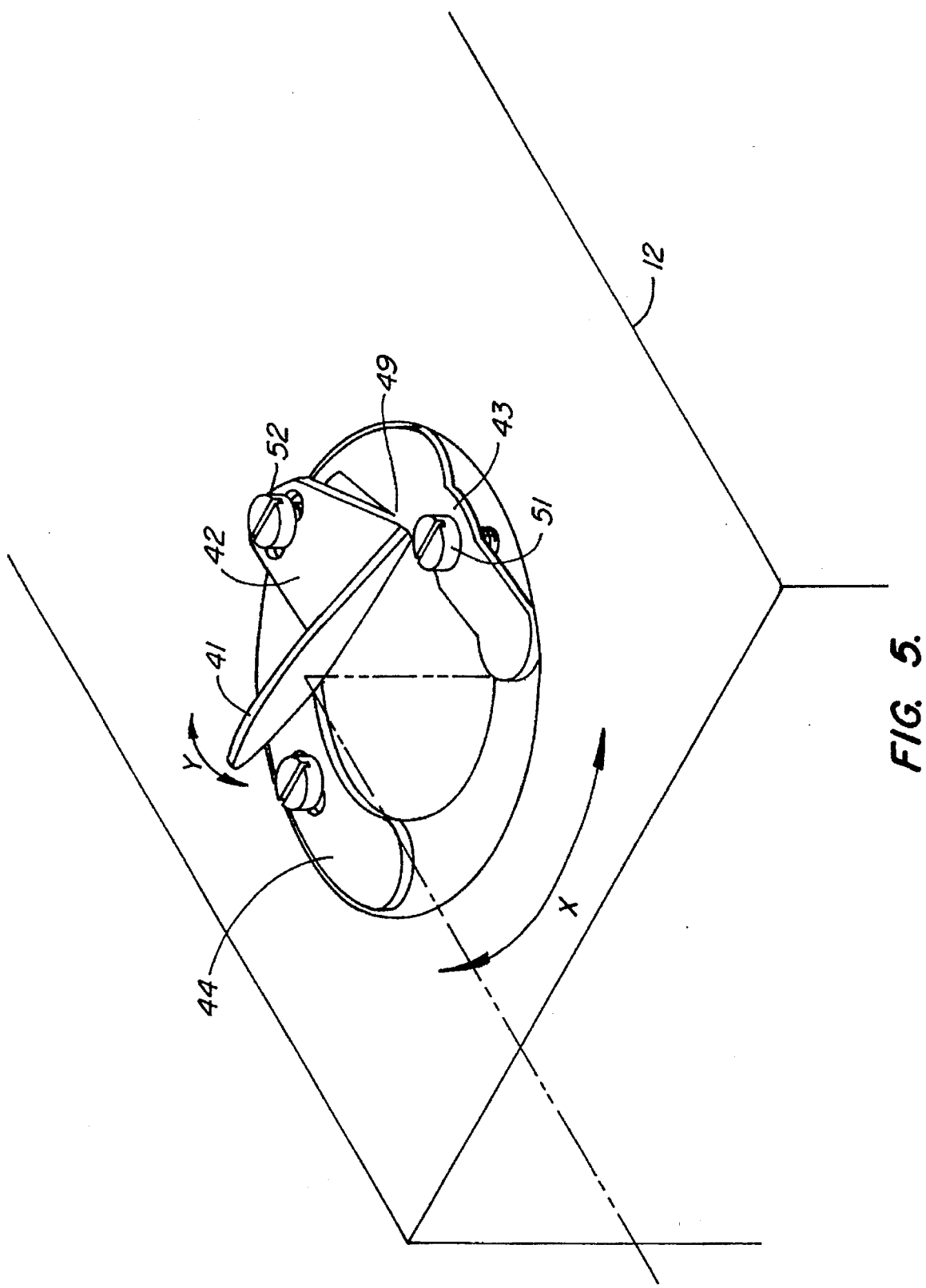
FIG. 5 is a perspective view of the mirror element mounted on the housing.

FIG. 4B is a cross-sectional view of the formed part after bending and FIG. 5 is a perspective view of the formed mirror element 40 mounted on the housing 12 in counterbore. The reflecting tab 41 and vertical adjustment tab 42 are coupled to the mounting tabs 43 and 44 at base corners 49 and 50. The aiming mechanism includes a registration screw 51 which passes through the registration hole 47 into a threaded opening in the housing 12 and vertical adjustment screw 52 which passes through the vertical adjustment screw slot 42s.

The vertical orientation of the reflected second beam 64r about a y-axis, perpendicular to the plane of FIG. 1, is easily accomplished by turning the vertical adjustment screw 52 which causes flexure at the base corners 49 and 50 of the reflecting tab 41 which rotates the tab 41 in the plane of FIG. 1. Similarly, the azimuthal orientation of the reflected second beam 64r about an x-axis, in the plane of FIG. 1 and perpendicular to the optical axis, is easily accomplished by turning the registration screw 51 which causes a flattening of the preformed arch of the vertical riser section 46 to cause a rotation of the mirror element 40 in the counterbore.

Figure 6:
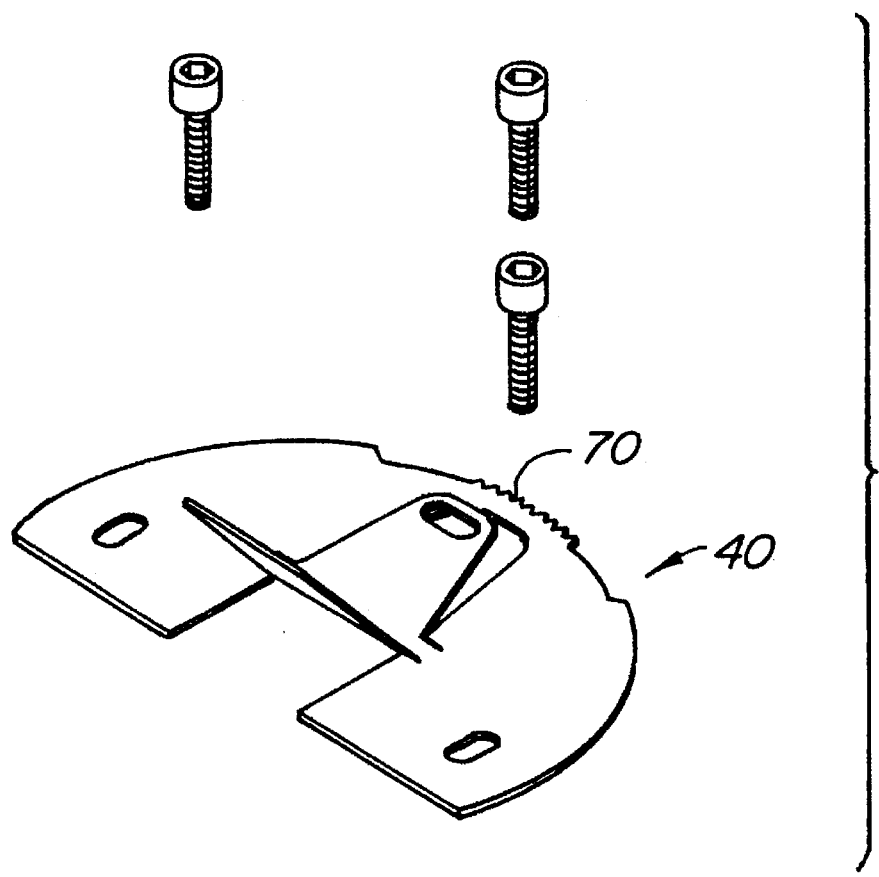
FIG. 6 is a perspective view of a second embodiment of the mirror element.
Figure 7:
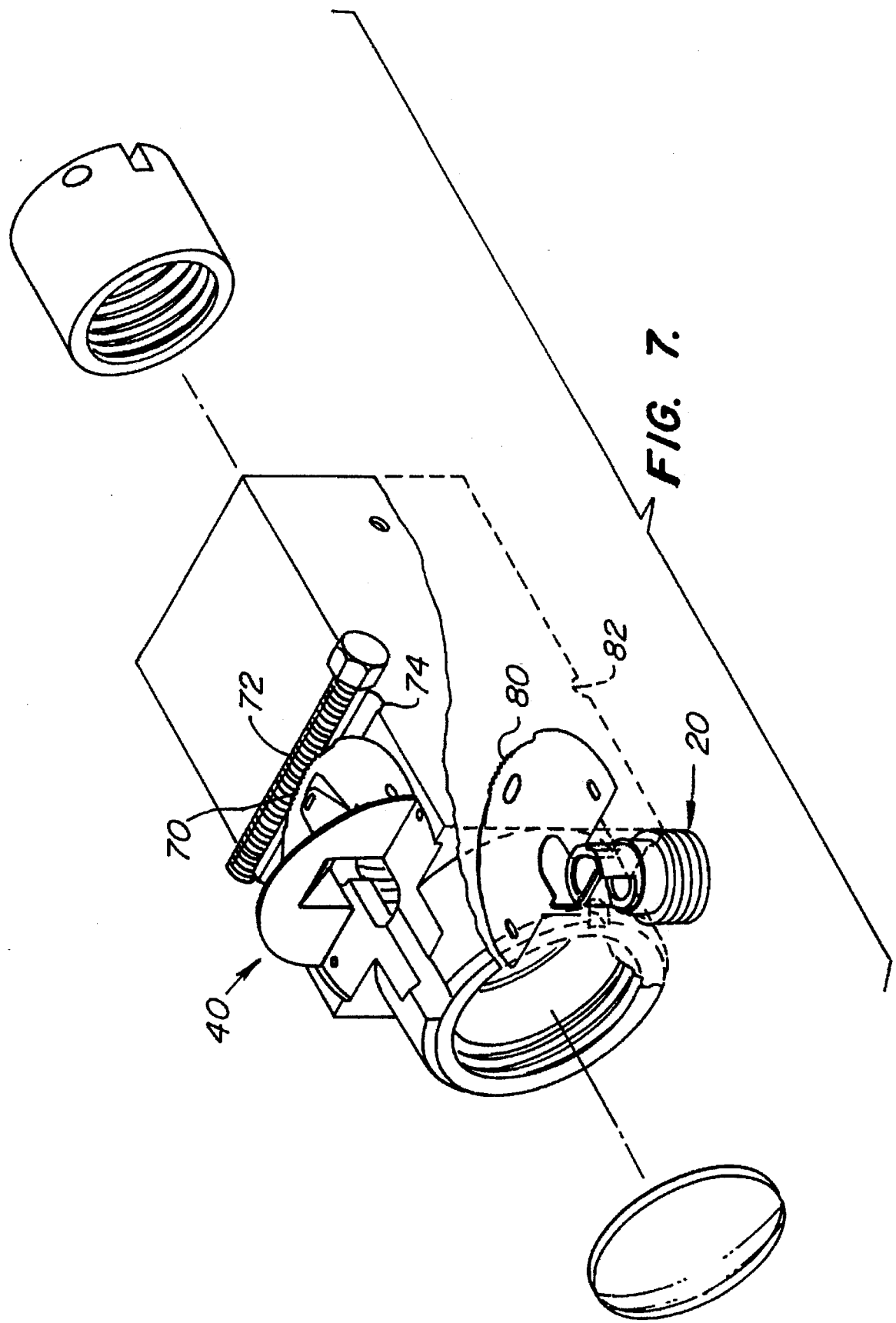
FIG. 7 is a perspective partially cut away view of the second embodiments of the mirror element and beam splitter assembly coupled to the housing.

A second embodiment of the beam splitter assembly 20 and mirror element 40 that utilizes a different azimuthal adjustment mechanism to orient the laser beams about the x-axis will now be described with reference to FIGS. 6 and 7. In FIG. 6, the riser 43 is not utilized; instead a toothed section 70 is formed on perimeter of the base 45. As depicted in FIG. 7, a mirror rotational adjustment screw 72 is received in a slot 74 in the housing 12 and has its threads coupled to the toothed member 70 so that rotation of the rotational adjustment screw 72 causes the mirror element 40 to rotate about the x-axis. The toothed member 70 and thread of the adjustment screw 72 cooperate as a rack and pinion. Thus, simply turning the mirror rotational adjustment screw 72 allows for precise positioning of the reflected second beam 64r about the x-axis.

A similar rotational adjustment is utilized on a second embodiment of the beam splitter assembly 20. As depicted in FIG. 7, the vertical adjustment slot 29 in the bottom section 24b of the leaf spring member 24 is not utilized; instead a toothed section 80 is formed on perimeter of the bottom section 24b of the leaf member. A beam splitter rotational adjustment screw (not shown) is received in slot 82 and controls the orientation of the first beam 62 about the x-axis as described above for the mirror element 40.

A procedure for adjusting the placement of the beams will now be described. It is not sufficient merely to align the housing 10 along it axis of symmetry to determine the optical axis of the IR imaging system because imperfections in the lens and mechanical misalignment often cause the optical axis to be displaced from the axis of symmetry of the housing. Accordingly, for a close focus instrument, a heat source is provided at the focal point of the lens 14 and the housing 12 is oriented so that the output signal from the detector is maximized. Thus, the optical axis of the IR imaging system is aligned to pass through the heat source.

Next, the beam splitter assembly is adjusted by utilizing the vertical and azimuthal adjustment mechanisms described above to direct the first beam to intersect the heat source target. Finally, the mirror assembly is adjusted utilizing the vertical and azimuthal adjustment mechanisms described above to position the reflected second beam to intersect the target.

Alternatively, for a divergent beams designed to define a focal spot for an instrument having a far focus (e.g., 50 feet to infinity) the beams would be oriented to intersect a circle of a predetermined radius with the target spot at its center.

In currently preferred embodiment a diode laser emitting light having a wavelength of 670 nanometers (nm). However, this wavelength requires high energy beams that could injure the eye in certain circumstances. Other embodiments will utilize diode lasers having wavelengths of 650 nm or 630 nm which are more visible to the eye thus requiring lower energy.

Figure 8A:
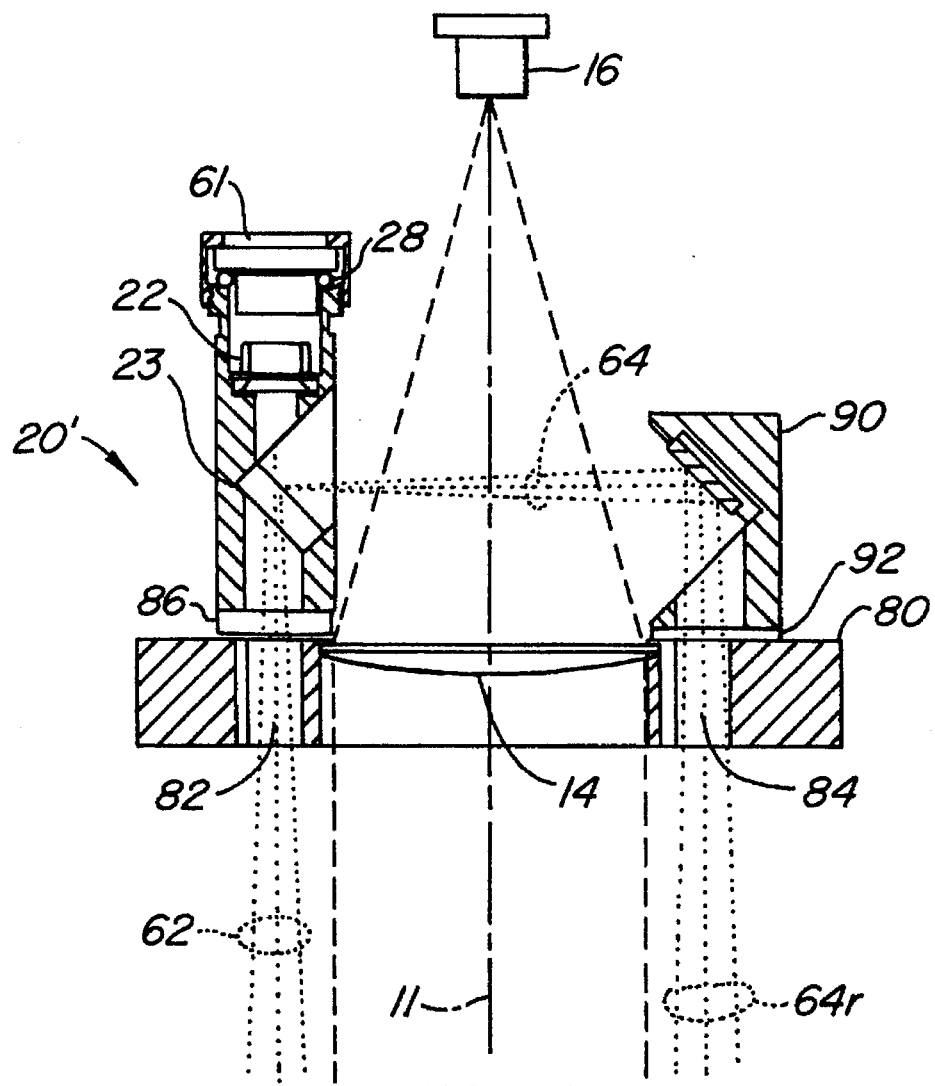
FIGS. 8A and 8B are cross-sectional and plan views, respectively, of a second embodiment of the invention.
Figure 8B:
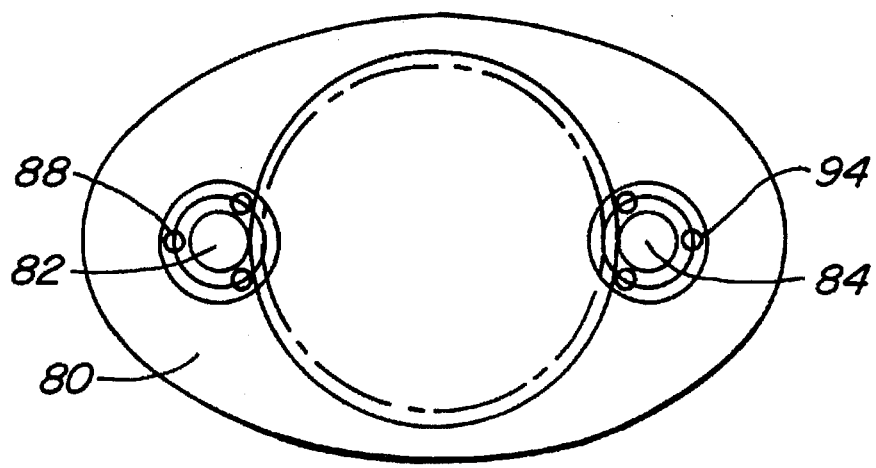

An alternative embodiment of the invention will now be described with reference to FIGS. 8A and 8B. A bulkhead 80 is fitted in the end of the housing 12 and includes an aperture for the IR lens 14 and primary and reflective apertures 82 and 84 for transmitting the first laser beam 62 and reflected second laser beam 64r.

A beam splitter assembly 20' is mounted on a first compressible elastomer ring 86 and fastened to the bulkhead by three laser adjusting screws 88 passing through bulkhead 80 and elastomer ring 86 into the base of the beam splitter assembly 22'. Similarly, a mirror housing 90 is mounted on a second compressible elastomer ring 92 and fastened to the bulkhead by three laser adjusting screws 94 passing through the bulkhead 20 and elastomer ring 92 into the base of the mirror housing 90.

The vertical and azimuthal orientation of the first laser beam can be adjusted by turning the laser adjustment screws 88 to differentially compress the first elastomer ring 86 to tilt the beam-splitter assembly 22'. The orientation of the laser adjustment screws about the circumference of the aperture 82 provides for stability and a full range of vertical and azimuthal adjustability. The vertical and azimuthal of the reflected second beam is similarly adjusted utilizing the laser adjustment screws 94.

In one embodiment of the invention, a hand-held unit utilizes a dual function trigger that both initializes the temperature measurement function and activates a data logging function. The structure of the dual function trigger is depicted in FIGS. 9A and 9B.

Figure 9A:
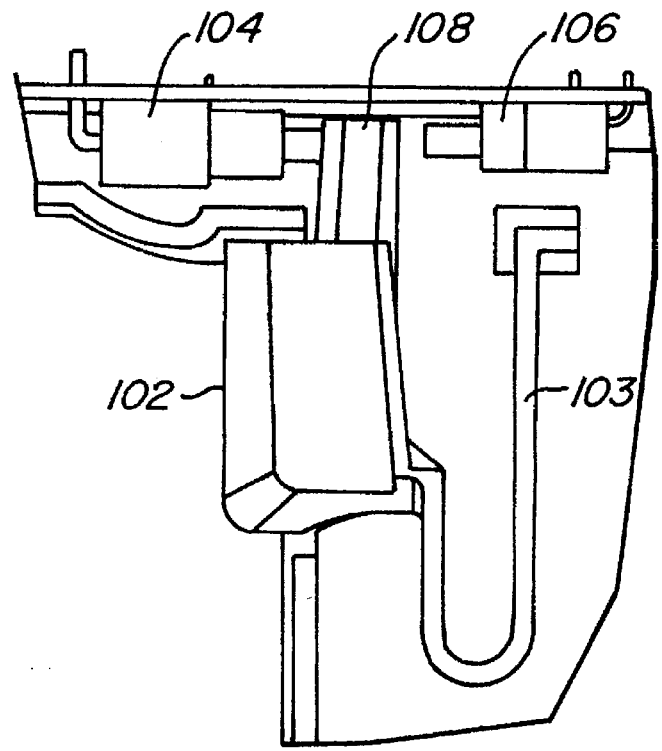
FIGS. 9A and 9B are cross-sectional views of a dual trigger mechanism.
Figure 9B:
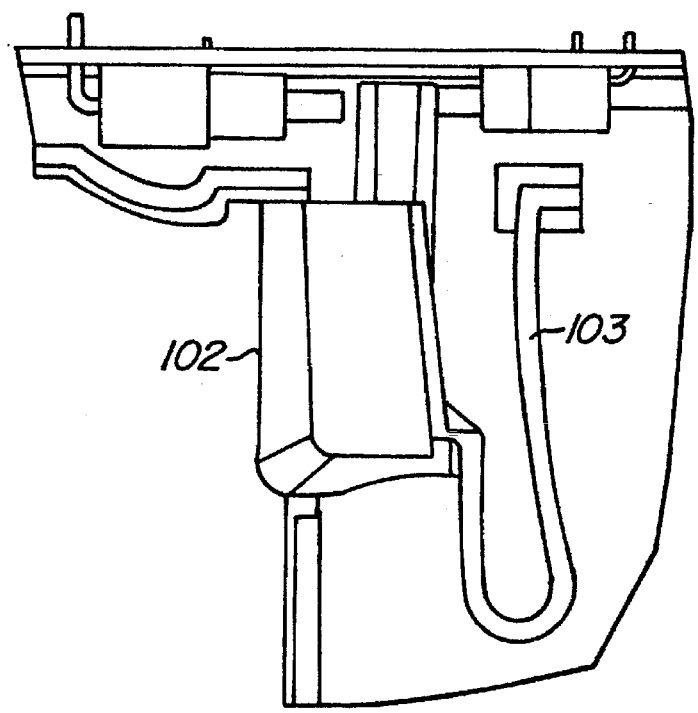

A trigger 102 is compressed against a biasing spring 103 between a first position depicted in FIG. 9A and a second position depicted in FIG. 9B. A measurement initialization switch 104 and a data log switch 106 are mounted to the housing 12. An actuating arm 108 is coupled to the trigger 102 and engages the measurement initialization switch 102 when the trigger 102 is in the first position and engages the data log switch 106 when the trigger 102 is in the second position.

The operation of the dual trigger mechanism will now be described. In the preferred embodiment, a datalogger function, datalogging storage location, and other measurements may be selected by switches on a measurement panel (not shown). The user then aims the unit at a target.

The user presses the trigger 102 to an intermediate position, forward of the second position, to toggle the measurement initialization switch 104 which activates a microprocessor (not shown). Once the microprocessor is active normal running control is initiated and the unit calculates and displays temperature.

Should the operator wish to record the displayed temperature for future retrieve the trigger 102 is depressed to the second position to activate the data log switch 106. The microprocessor routinely polls this switch 106 and, after the switch 104 has been toggled, the displayed temperature and parameters are stored into non-volatile memory. This information is available for future retrieval or downloading through an RS-232 port.

Audio feedback is provided to the operator to confirm that data is being logged either in form of a click when the data log switch 106 is activated or by an audio transducer. Additionally, visual feedback can be provided as an icon on the temperature display panel.

The invention has now been described with reference to the preferred embodiments. Alternatives and substitutions will now be apparent to persons of ordinary skill in the art. For example, although the preferred embodiment utilizes a semiconductor diode laser, in certain circumstances the substitution of high power LED may be appropriate. Additionally, other adjustment mechanisms such as a cam may be utilized to adjust the vertical and azimuthal orientation of the beams. Further, in the embodiments described the IR radiation is focused by a lens and the beam splitter is a half-silvered mirror, however, a focusing mirror could also be utilized to focus the IR radiation and a prism could be utilized to split a beam. Also, other mechanisms for compressing the elastomer rings such as clamps could be utilized. Accordingly, it is not intended to limit the invention except as provided by the appended claims.

What is claimed is:

1. An infrared temperature sensor, comprising;
    an elongated body having an interior cavity surrounded by a body surface, with the body having an IR opening at one end;
    an infrared light sensor, located within said body and comprising a focusing element and a detector, with the focusing element for focusing IR radiation emitted from a focal area disposed along an optical axis, and with the IR radiation passing through the IR opening onto said detector;
    a beam splitter assembly including a beam splitter for splitting an incident beam of light into first and second beams, with the first beam directed toward said focal area;
    a beam splitter positioning mechanism, mounting said beam splitter on said body and displaced from said optical axis in a first direction, for adjusting the vertical and azimuthal position of the first and second beams;
    a mirror assembly, including a mirror having a reflecting element; and
    a mirror assembly positioning mechanism, mounting said mirror assembly on said body and displaced from said optical axis in a second direction, for adjusting the vertical and azimuthal position of said second light beam from said beam splitter with the second light beam being incident on the reflecting element and reflected toward the focal area.

2. The infrared temperature sensor of claim 1 further comprising:
    a bulkhead, disposed in said body and holding said focusing element, said bulkhead having first and second directional apertures;

with said beam splitter positioning mechanism comprising:
- a first compressible ring disposed between a base of said beam splitter assembly and said first directional aperture; and
- a compression mechanism for differentially compressing said first compressible ring to adjust the vertical and azimuthal positions of said first and second beams.

3. The infrared sensor of claim 2 wherein said mirror assembly positioning mechanism comprises:
- a second compressible ring disposed between a base of said beam splitter assembly and said second directional aperture; and
- a second compression mechanism for differentially compressing said second compressible ring to adjust the vertical and azimuthal positions of said second beam that is incident on said reflecting element.

4. An infrared temperature sensor, comprising:
- an elongated body having an interior cavity surrounded by a body surface with an interior side and an exterior side, with the body having an IR opening at one end, and first and second beam openings oppositely disposed on said body surface;
- an infrared light sensor, located within said body and comprising a focusing element and a detector, with the focusing element for focusing IR radiation emitted from a focal area disposed along an optical axis, and with the IR radiation passing through the IR opening onto said detector;
- a beam splitter assembly including a beam splitter for splitting an incident beam of light into first and second beams;
- a beam splitter positioning mechanism, mounting said beam splitter on the exterior side of said body above said first beam opening, for adjusting the vertical and azimuthal position of the first and second beams; and
- a mirror assembly, mounted on the exterior side of said body above said second beam opening, including a reflecting element and a positioning mechanism for adjusting the vertical and azimuthal position of the second light beam that traverses said first and second beam openings and is incident on the reflecting element.

5. The infrared temperature sensor of claim 4 wherein said beam splitter assembly is an integrated housing further comprising;
- a cylindrical beam splitter housing having an inner bore and upper and lower ends and a slot, within said bore and disposed near the lower end, for rigidly holding said beam splitter;
- a beam focusing lens disposed within said inner bore above said beam splitter;
- a light source housing for holding a light source and for fitting over the upper end of said beam splitter housing and for sinking heat emitted by light source; and
- a focal adjustment mechanism, coupling the beam splitter housing and the light source housing, for adjusting the distance between the light source and said beam focusing lens.

6. The infrared temperature sensor of claim 4 wherein said beam splitter positioning mechanism comprises:
- a leaf spring, formed of a single metal part, having a bottom, vertical, and top sections;
- with said bottom section including an opening for allowing a light beam to pass therethrough, screw slots for mounting said leaf spring to said body and a vertical adjustment screw slot;
- with said top section including an opening for mounting said beam splitter assembly therein and a vertical adjustment screw slot; and
- with said vertical section coupling said bottom and top sections to provide flexure when a vertical adjusting screw, passing through said vertical adjustment screw slots and threaded into said body, is turned.

7. The infrared temperature sensor of claim 6 with said bottom section including a toothed member disposed along an outside perimeter, with said toothed member having teeth for engaging the thread of an azimuthal adjustment screw so that the azimuthal position of the first and second beams is finely adjusted when the azimuthal adjustment screw is turned.

8. The infrared temperature sensor of claim 4 wherein said mirror assembly comprises:
- a single metal part having a reflector tab and vertical adjustment tab coupled to first and second mounting tabs and a base by base corners;
- with said mounting tabs including mounting screw slots; and
- with said vertical adjusting tab including a vertical adjusting screw slot so that the vertical position of an incident beam reflecting from said reflecting tab can be adjusted by turning a vertical adjustment screw passing through said vertical adjustment screw slot and threaded through said body.

* * * * *